Apr. 24, 1923.
J. V. CARITHERS ET AL
1,453,128
DRINK MIXER
Filed Sept. 20, 1922 2 Sheets-Sheet 1
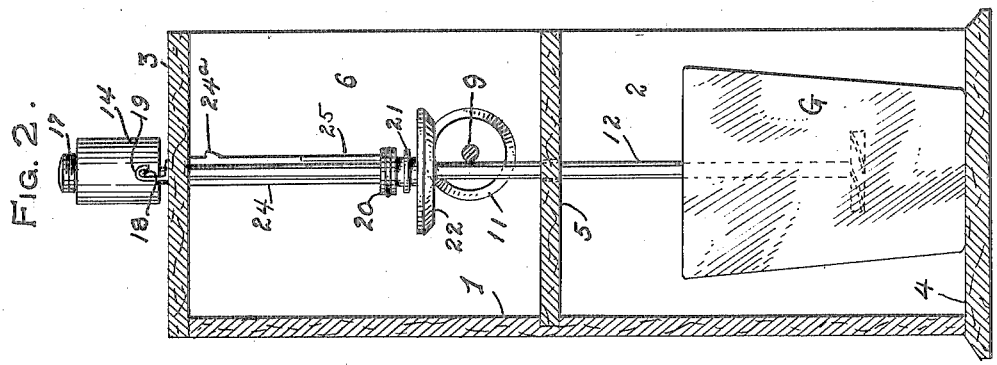
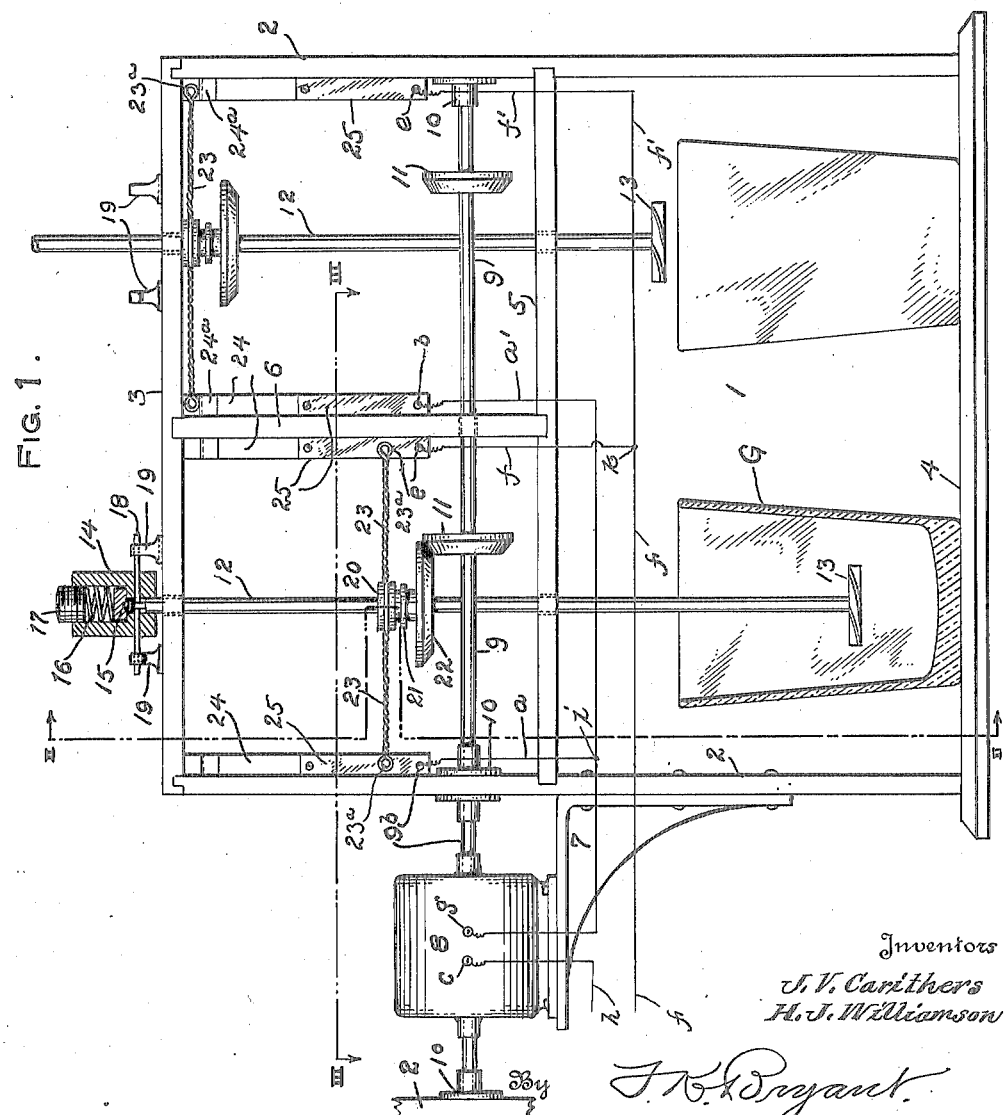
Inventors
J. V. Carithers
H. J. Williamson
By F. K. Bryant
Attorney

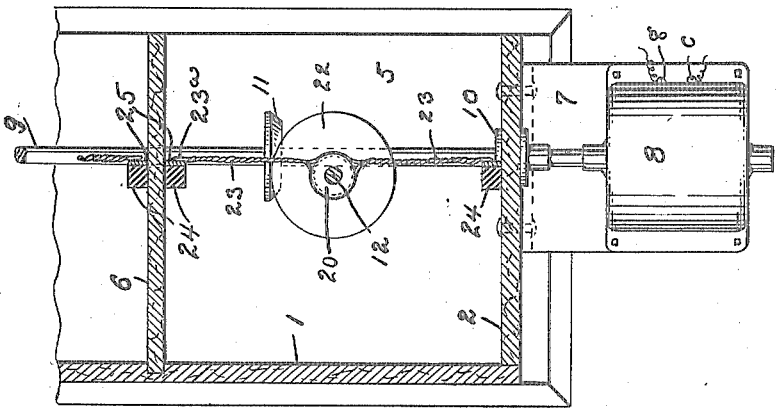

Patented Apr. 24, 1923.

1,453,128

UNITED STATES PATENT OFFICE.

JAMES V. CARITHERS AND HARLEY J. WILLIAMSON, OF POMEROY, WASHINGTON.

DRINK MIXER.

Application filed September 20, 1922. Serial No. 589,439.

*To all whom it may concern:*

Be it known that we, JAMES V. CARITHERS and HARLEY J. WILLIAMSON, citizens of the United States of America, residing at Pomeroy, in the county of Garfield and State of Washington, have invented certain new and useful Improvements in Drink Mixers, of which the following is a specification.

This invention relates to certain new and useful improvements in drink mixers and has particular reference to the idea of providing a plurality of mixing shafts that are operable from a single source of power such as an electric motor.

The invention further provides in a drink mixer of the above type, the idea of a plurality of mixing shafts that are independently operable for closing the circuit with the motor, rendering any one or all of the shafts operable when desired.

A still further object of the invention embodies in a drink mixer of the above type, the provision of means for rendering the mixing shafts operable when the lower ends thereof move in a direction adjacent the upper end of a container, assuring a thorough mixing of the liquid or drink at the upper and lower ends of the container.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a fragmentary front elevational view of a drink mixer showing a battery of mixing shafts associated with a single motor, one of the mixing shafts illustrated being elevated to its inoperative position, and the other of said mixing shafts being lowered to its operative position, Figure 2 is a vertical cross sectional view taken on line II—II of Fig. 1, Figure 3 is a horizontal sectional view taken on line III—III of Fig. 1, Figure 4 is a vertical sectional view of a modified form of drink mixer wherein the single operating motor is centrally positioned and the mixing shafts are arranged in circular series enclosing the motor, and Figure 5 is a detail sectional view similar to Fig. 2, showing another form of the invention wherein the mixing shaft is rendered operative at the beginning of the lowering movement thereof.

Referring more in detail to the accompanying drawings, and particularly to Figs. 1 to 3, there is illustrated a drink mixer of the battery type wherein a single motor is adapted for driving a plurality of independent mixer shafts, the device including a casing having a rear wall 1, end walls 2, a top and bottom wall 3 and 4 respectively, a centrally positioned horizontal partition wall 5 and a vertical partition wall 6 in the upper compartment afforded by the horizontal partition wall as clearly shown in Figs. 1 and 2, the front side of the casing being entirely open as illustrated. One end wall 2 of the casing supports the bracket 7 upon which an electric motor 8 is mounted, the horizontal shaft 9 of said motor extending into the casing and journaled in bearings 10 shown more clearly in Fig. 1, it being understood, as fragmentarily illustrated in Fig. 1 that a mixer casing may be disposed at each side of the motor with the single motor shaft extending into each casing. A beveled friction drive wheel 11 is fixed to the motor shaft 9 within the casing, the friction drive wheel 11 being provided upon said motor shaft for each perpendicular mixing shaft. The perpendicular mixing shaft 12 is disposed at each side of the partition 6 as shown in Fig. 1, the same freely extending through an opening in the horizontal partition 5 and being provided upon its lower end with a beater head or blade 13. The upper end of the mixing shaft 12 projects through the upper wall 3 of the casing and has swiveled upon the upper projecting end thereof, a head 14 capable of limited axial movement relative to said shaft by the type of swivel connection shown in Fig. 1. The head 14 is in the form of a cup-shaped member with the upper end of the mixing shaft 12 extending through the bottom wall thereof that is engaged by a disk 15 under the influence of the spring 16, the tension is controlled by the screw plug 17. A cross arm 18 carried by the head 14 projects diametrically therefrom for engagement with the reversely positioned diametrically opposite hook-shaped keepers 19, the cross arm 18 being moved into engagement with said keepers for holding the mixing shaft 12 at its limit of downward movement.

A collar 20 is swiveled on the mixing shaft 12 and is swivelly connected to the boss 21 of the beveled friction gear 22 that is keyed to the mixing shaft 12. When the mixing shaft 12 is at its limit of downward movement, the beveled friction gear wheels 11 and 22 are in engagement for transmitting power from the motor shaft 9 to the mixing shaft 12 as will at once be obvious.

The electrical connection between the motor 8 and the mixing shaft 12 includes laterally extending contact arms 23 carried by the swiveled collar 20, the end 23ª of the contact arm moving over guide rails 24 carried by the end wall 2 of the casing and the partition wall 6, said guide rails supporting relatively long contact plates 25. The wire connections between the contact plates 25 and the motor 8 include a circuit wire —a— having a terminal connection —b— with one of the contact plates 25 while the other end thereof is connected to the terminal —g— of the motor. The terminal —e— of the other contact plate 25 in the same compartment of the casing at one side of the partition 6 has a circuit wire connection —f— leading to the source of power. The circuit wire —a'— for the contact plate 25 in the other casing compartment is connected as at —i— with the circuit wire —a—, while the circuit wire —f'— of the other contact plate is connected as at —k— to the aforesaid circuit wire —f—. The wire —h— connected to the terminal —c— of the motor leads to the source of power.

When the mixing shaft 12 is at its limit of upward movement as shown in Fig. 1, the end contacts 23ª of the contact arms 23 are supported on ledges 24ª carried by the upper ends of the guide rails 24 for holding the mixing shaft in an elevated position. A glass G holding a drink to be mixed, is placed upon the bottom wall 4 of the casing directly beneath a mixing shaft 12, the shaft 12 being lowered to position the mixing blade or head 13 within said glass as shown in Fig. 1, and during the lowering movement of the mixing shaft, the contact arms 26 are moved into engagement with the contact plates 25 for completing the circuit to the motor 8, thereby rotating the motor shaft 9 and through the friction gear connections 11—22, to rotate the mixing shaft 12, the same being held in its lowered position with the friction gears 11 and 22 in positive engagement by the cross arm 18 carried by the mixing shaft head 14 confined by the hooked keepers 19 as shown in Fig. 1. The friction gear 22 being fixed to the mixing shaft 12, and swiveled to the collar 20, will rotate said mixing shaft while the collar 20 remains in a stationary position. The circuit wires to the motor 8 are broken when the collar 20 is elevated as shown in Fig. 1 for displacing the contact ends 28 from the contact plate 25.

In the form of the invention shown in Fig. 4, a plurality of perpendicular mixing shafts is arranged in circular series, a base plate 26 supporting a rotatable disk 27 with interposed antifriction ball bearings 28 while perpendicular posts 29 positioned adjacent the periphery of the disk 27 support a casing 30 at their upper ends. The casing 30 includes a centrally positioned bearing 31 for the motor 32. The shaft 33 depending from the motor 32 carries a relatively large friction gear wheel 34 positioned centrally within the casing 30. A plurality of mixing shafts 35 arranged in circular series around the motor 32 perpendicularly project through the casing 30, each mixing shaft 35 being provided with a relatively long spline 36 with which the hub 37 of the friction gear wheel 38 is associated, said gear and hub being disposed within the casing 30. The head 14ª of the mixing shaft is constructed similar to the head 14 described in connection with the showing in Figs. 1 to 3, the same carrying a laterally extending arm 18 cooperating with hooked keepers 19 upon the base flange 31ª of the motor bearing 31. The rotatable disk 27 is provided with spaced sockets 27ª disposed beneath an adjacent mixing shaft 35 for supporting the glass G as illustrated. In the operation of this form of the device, the motor 32 being switch controlled is placed in operation for rotating the main centrally positioned friction drive gear 34. When the mixing shaft 30 is at its limit of upward movement as shown at the left hand side of Fig. 4, the lower end of the spline 36 cooperates with the lower end of the gear bearing 37 for elevating the gear to the position illustrated and out of contact with the drive gear 34, the mixing shaft 35 and gear 38 being maintained in an elevated position by the spring finger 39 carried by the bottom wall of the casing 30 extending into the annular groove 40 formed in the mixing shaft 35. Downward pressure upon the upper end of the mixing shaft 35 will disengage the same from the spring finger 39, permitting the friction gear 38 splined upon the shaft 35 to fall by gravity into engagement with the guard gear 34 with the result that the mixing shaft starts rotating at the beginning of the lowering movement thereof, continued downward movement of said mixing shaft causing the upper end of the spline 36 to engage the upper end of the gear bearing 37 for frictionally holding the gear 38 into engagement with the gear 34, the transverse arm 18 locking the gears in position.

It will therefore be seen that when the motor 32 is in operation for rotating the main driving friction gear 34, anyone of the circularly positioned mixing shafts 35 may be moved into operative engagement therewith. Also, the disk 27 rotatably mounted upon the base plate 26 and supporting the entire mechanism thereabove, may be rotated in the desired position for placing a glass in one of the sockets 27ª.

Still another form of the invention is shown in Fig. 5, a box structure thereof being similar to the form of the invention shown in Figs. 1 to 3, the collar 20ª that carries the oppositely extending contact arms being swiveled upon the mixing shaft 41 and movable with said shaft when the same is raised and lowered. A friction gear wheel 42 is splined upon the shaft 41 having the longitudinal groove 41ª, said gear 42 carrying an annularly grooved upstanding bearing 43 that is engaged by the spring finger 44 secured to the rear wall 1 of the casing. When the shaft 41 is elevated to the position illustrated in Fig. 5, the lower end of the spline 41ª cooperates with the depending sleeve 45 carried by the gear 42 for elevating said gear out of engagement with the drive gear 11 upon the motor shaft 9 and against the tension of the spring finger 44, this construction of mixer permitting immediate engagement between the gears 11 and 42 at the beginning of the lowering movement of the shaft 41 and when the mixing blade 13 is adjacent the upper end of a glass G.

While there are herein shown and described the preferred embodiments of the present invention, it is nevertheless to be understood that minor changes may be made in the invention without departing from the spirit and scope thereof as claimed.

What is claimed is:—

1. In a drink mixer, a casing having a horizontal wall, a power shaft journaled above the wall, a plurality of vertically slidable perpendicular mixing shafts associated with the power shaft and extending through the horizontal wall of the casing, stationary bearings through which the mixing shafts are slidable and a mixer carried by the lower end of each shaft and constantly remaining below the horizontal wall.

2. In a drink mixer, a casing, a motor supported by the casing and having a horizontal power shaft extending through the casing, spaced gear wheels fixed to said shaft, vertically shiftable mixing shafts journalled in said casing, a gear wheel carried by each mixing shaft adapted to be moved into and out of engagement with the adjacent gear on the power shaft, electrical make-and-break devices carried by the casing and each mixing shaft, electrical connections between the motor and make-and-break devices, said make-and-break devices including plate contacts carried by the casing, and laterally extending contact arms carried by the mixing shaft gear.

3. In a drink mixer, a casing, a motor supported by the casing, and having a horizontal power shaft extending through the casing, beveled friction gear wheels fixed to the power shaft, a perpendicular mixing shaft vertically shiftable within the casing adjacent each beveled gear, a collar swivelled on the mixing shaft, a friction beveled gear keyed to the mixing shaft and swivelled to said collar, electrical make-and-break devices carried by the casing and mixing shaft, and electrical connections between the motor and make-and-break devices.

4. In a drink mixer, a casing, a motor supported by the casing, and having a horizontal power shaft extending through the casing, beveled friction gear wheels fixed to the power shaft, a perpendicular mixing shaft vertically shiftable within the casing adjacent each beveled gear, a collar swivelled on the mixing shaft, a friction beveled gear keyed to the mixing shaft and swivelled to said collar, contact plates carried by the casing, contact arms projecting diametrically from said collar, and electrical connections between the motor and contact plates.

5. In a drink mixer, a casing, a motor supported by the casing, and having a horizontal power shaft extending through the casing, beveled friction gear wheels fixed to the power shaft, a perpendicular mixing shaft vertically shiftable within the casing adjacent each beveled gear, a collar swivelled on the mixing shaft, a friction beveled gear splined on the mixing shaft, cooperating means carried by the casing and last named gear for holding the two gears in frictional contact, said gears being separated when the mixing shaft reaches its limit of upward movement, contact plates carried by the casing, contact arms projecting diametrically from said collar, and electrical connections between the motor and contact plates.

In testimony whereof we affix our signatures.

JAMES V. CARITHERS.
HARLEY J. WILLIAMSON.